(12) United States Patent
Livengood (10) Patent No.: US 10,156,260 B1
(45) Date of Patent: Dec. 18, 2018

(54) POWER TAKE-OFF QUICK COUPLER

(71) Applicant: Phillip H. Livengood, Caldwell, TX (US)

(72) Inventor: Phillip H. Livengood, Caldwell, TX (US)

( * ) Notice: Subject to any disclaimer, the term of this patent is extended or adjusted under 35 U.S.C. 154(b) by 53 days.

(21) Appl. No.: 15/617,621

(22) Filed: Jun. 8, 2017

(51) Int. Cl.
*F16D 1/02* (2006.01)
*A01B 71/06* (2006.01)
*F16D 1/108* (2006.01)

(52) U.S. Cl.
CPC ............. *F16D 1/02* (2013.01); *A01B 71/06* (2013.01); *F16D 1/108* (2013.01)

(58) Field of Classification Search
CPC ............ F16D 1/02; F16D 1/108; A01B 71/06
See application file for complete search history.

(56) References Cited

U.S. PATENT DOCUMENTS

| | | | | |
|---|---|---|---|---|
| 3,427,826 A * | 2/1969 | Anderson | ............... | F16D 3/50 464/32 |
| 7,284,625 B2 * | 10/2007 | Jones | ............... | B60K 25/02 180/53.4 |
| 8,534,060 B1 * | 9/2013 | Bennett | ............... | F16D 11/10 60/458 |
| 2013/0230352 A1 * | 9/2013 | Goulet | ............... | A01B 71/06 403/364 |
| 2016/0238081 A1 * | 8/2016 | Knuth | ............... | A01B 71/06 |
| 2018/0252270 A1 * | 9/2018 | Spector | ............... | F16D 1/108 |

* cited by examiner

Primary Examiner — Drew J Brown
(74) Attorney, Agent, or Firm — Douglas Baldwin (57) ABSTRACT

Disclosed is a two-component power take-off (PTO) coupling system for efficient and simplified attachment of implements to a power take-off system of a tractor or other prime mover, having a first component to be attached to the PTO shaft of the tractor or other driver and a second component attached to the implement to be coupled. The coupling system serves to eliminate the difficult task of attaching or detaching a power shaft on a rotary driven farm implement such as a rotary cutter, tiller, generator, pump, etc. to tractor power take off (PTO) or any other driver that has an auxiliary splined power out-put shaft. It is designed for any application in any industry that requires frequent connecting or disconnecting of a rotating shaft to transfer power or torque. The coupling system can accommodate two different series PTO shaft types for example, if the implement has a type two (2) shaft but the owner's tractor is a type one (1) the coupling system can be adapted to accommodate both.

15 Claims, 5 Drawing Sheets

POWER TAKE-OFF QUICK COUPLER

BACKGROUND

Field of Invention

The present invention relates to coupling for connecting power take-off systems. More specifically it related to easily connectable couplings for connecting implements to power take-off system of tractors and like rotary drivers.

Copyright Notice

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all (copyright or mask work) rights whatsoever.

Background

The power take-off (PTO) shaft has been existence on tractors and or prime movers since the early years of the 20$^{th}$ century. The typical method of attaching the power shaft of an implement to the PTO shaft on a tractor or prime mover requires a person the place their body in a difficult position and location, lift a heavy PTO shaft while lining up the female splines on the drive shaft and the male splines on the PTO shaft of the tractor while pushing in a locking button or pulling a release sleeve while pushing the drive shaft forward onto the PTO shaft on the tractor or driver. One of the biggest complaints in the industry is that there is not a safe and convenient method of attaching a tractor or other PTO driver shaft to an implement. Another complaint is in attaching the lift arms of a three-point hitch system on a tractor to an implement. Alignment between a tractor and an implement can sometimes be difficult as when the eye of the lift arm contacts the pin on the implement and requires one of the two units to move together while connecting. While there are some coupling system devices on the market, these are not entirely satisfactory or cost effective.

What is needed is a safe, cost effective PTO coupling system that can easily be attached to existing or new tractor and other driver PTO shafts and implement drive shafts. The present invention provides such a system.

BRIEF SUMMARY

The invention is a two-component power take-off (PTO) coupling system for efficient and simplified attachment of implements to a power take-off system of a tractor or other prime mover, having a first component that is to be attached to the PTO shaft of the tractor or other driver and a second component attached to the implement to be coupled.

The two component PTO coupling system of the invention serves to eliminate the difficult task of attaching or detaching a power shaft on a rotary driven farm implement such as a rotary cutter, tiller, generator, pump, etc. to tractor power take off (PTO) or any other driver that has an auxiliary splined power out-put shaft. It is designed for any application in any industry that requires frequent connecting or disconnecting of a rotating shaft to transfer power or torque. The coupling system can accommodate two different series PTO shaft types for example, if the implement has a type two (2) shaft but the owner's tractor is a type one (1) the coupling system can be adapted to accommodate both.

DETAILED DESCRIPTION

In the following detailed description, reference is made to the accompanying drawings that form a part hereof, and in which is shown by way of illustration specific implementations which may be practiced. These implementations are described in sufficient detail to enable those skilled in the art to practice the implementations, and it is to be understood that other implementations may be utilized and that logical, mechanical, and other changes may be made without departing from the scope of the implementations. The following detailed description is, therefore, not to be taken in a limiting sense.

In broad scope the invention is a two-component coupling system for efficient and simplified attachment of implements to a power take-off unit of a tractor or other prime mover (rotary driver or driver). A first component is attached to the PTO shaft of the tractor or other driver and a second component attached to the implement to be coupled. The first and second components may be permanently or releasably attached to a tractor PTO shaft and implement drive system respectively.

The first component consists of a support plate structure having a proximate side (facing the tractor body or driver when in use) and a distal side facing out and away from the tractor body when in use and having at least two holes near the edges and two dowels (projections from surface) extending from the distal side of the support plate structure that are spaced apart from the holes on the of the plate. At least two smaller holes may optionally be in the support plate and tapped for screw threads. The second component consists of a support plate having a proximate side (facing the implement to be connected when in use) and a distal side facing out and away from the implement body when in use. There are two tapered dowels attached to the surface, positioned and sized to be inserted into the holes on the first component and two holes positioned and sized to receive the holding dowels of the first component. The first and second components are connected by pinning the holding dowels or by an automatic latch system.

As used herein "implement" means a rotary driven implement such as a rotary cutter, tiller, generator, pump, etc. to be connected to tractor power take-off (PTO) or any other driver that has an auxiliary splined power out-put shaft. "Power take off" is any other rotary driver that has an auxiliary splined power out-put shaft.

Two set of embodiments are disclosed-a first set in which the first and second components are manually connected (Model 100) and a second set in which they are connected automatically when pushed together (Model 200).

Figure 1:
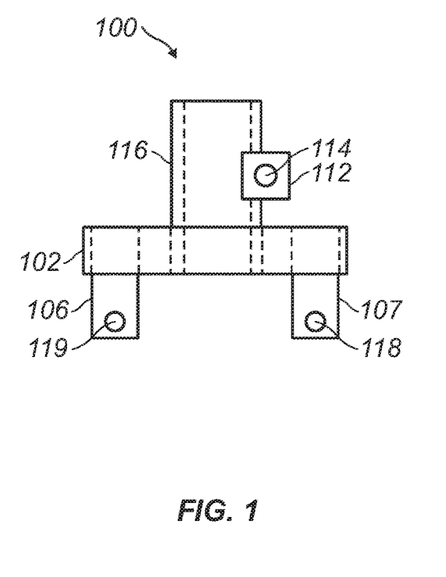
FIG. 1 is a side plan view of a first component of an embodiment of a two component coupling system of the invention.
Figure 2:
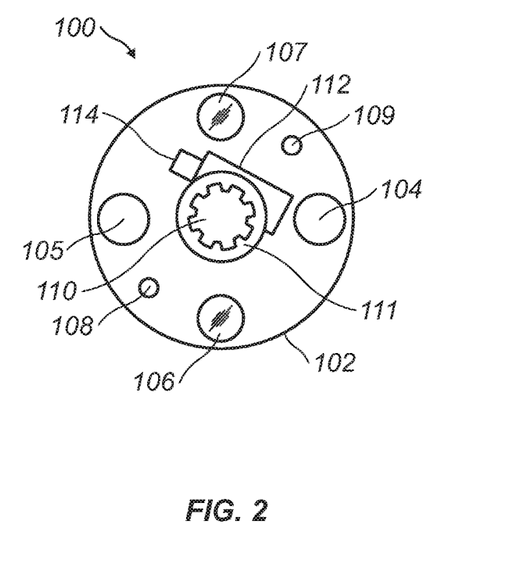
FIG. 2 is a plan view of the rear or proximal side of a first component of an embodiment of a two component coupling system the invention.
Figure 5:
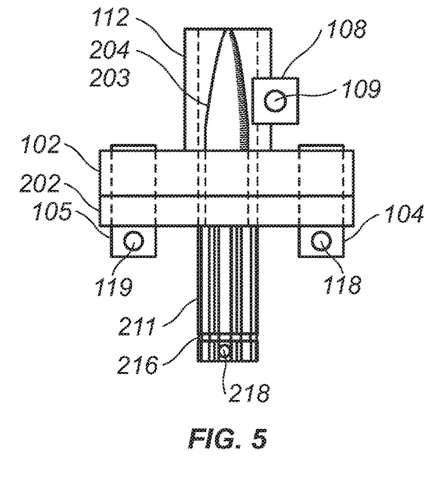
FIG. 5 is a plan side view of an assembly of an embodiment of a two component coupling system the invention.

Referring to the Figures, FIG. 1-7 illustrate embodiments of the first set of embodiments (Model 100). FIG. 1 is a side view of the first component, and FIG. 2 is a plan view of the rear or proximal side (face) of that component. This component has a support plate structure 102 to which is attached holding dowels 106 and 107 (dowels are preferably solid cylinders). These dowels are of sufficient length extending from the distal face of the support plate structure to pass through holes, 106 and 107, in the implement (second) component 200. They may be welded to the support or attached by threading and screwing into tapped holes or other suitable means. The dowels are sized so that the holes 218 and 119 on the dowels are accessible on the outside of the combined components when the components are connected as illustrated in FIG. 5. The dowels must be of sufficient size and strength to withstand the rotational torque when connected and operational. This component has openings or holes, 106 and 107 for receiving alignment dowels 203, 204 of the second component. Items 116, 112 and 114 are releasable means, of one embodiment, to attach the component to a power take-off (PTO) shaft ((see FIGS. 16 (Type 1) and 17 (Type 2)) of a tractor or other prime mover driver. Items 108 and 109 are optional holes that may be tapped for female threads to allow a cap screw or other suitable screw to be placed through the implement component holes 208 and 209 to add additional means to connect the component together. The structure 114 and 112 are means to connect the first component to a PTO shaft and, as shown, represent a conventional spring lock system that connects to PTO shafts. Item 112 is a receiver for the male splines of the shaft, that is, the receiver has female splines and functions in the same manner as the releasable connectors for conventual PTO connection system. As the female splined receiver (116) is moved onto the shaft, spring(s) behind bearings in the receiver are compressed until the receiver is advanced sufficiently far onto the shaft so that the bearings drop into a slot, 216, on the shaft. The receiver and shaft are disconnected by compressing the push button 114 to release the spring pressure holding the bearing into the shaft slot. Other means to attach the tractor component 100 to a PTO shaft are also suitable and while a releasable means is preferred, the component may be permanently attached to a PTO shaft, as by welding or pressure fitting.

Figure 3:
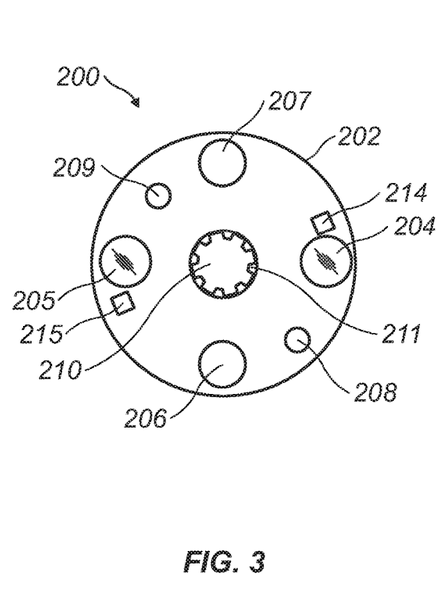
FIG. 3 is a rear or distal plan view of a second component of an embodiment of a two component coupling system of the invention.
Figure 4:
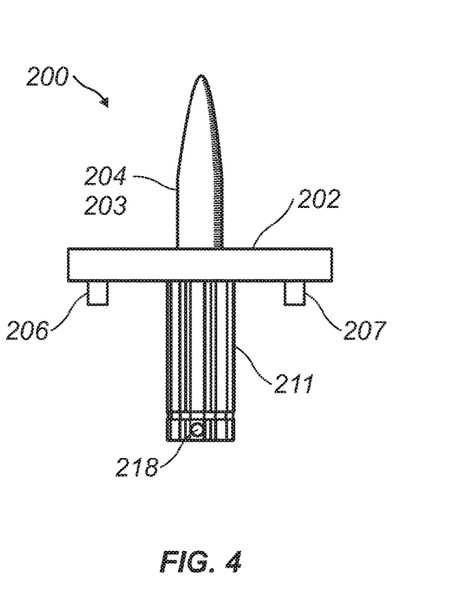
FIG. 4 is a plan side view of a second component of an embodiment of a two component coupling system the invention.

FIG. 3 is an end view of the second or implement or component, 200, of Model 100. It comprises a support plate structure 202 with tapered alignment dowels 204 and 205 and holes 206 and 207 to receive the holding dowels 106 and 107 from the first component (106 and 107). The alignment dowels are preferably cylinders, having an equal diameter section at the end adjacent the support plate surface that is at least the length of the receiving hole in the first component and tapered shape beyond the equal diameter section.

Figure 16:
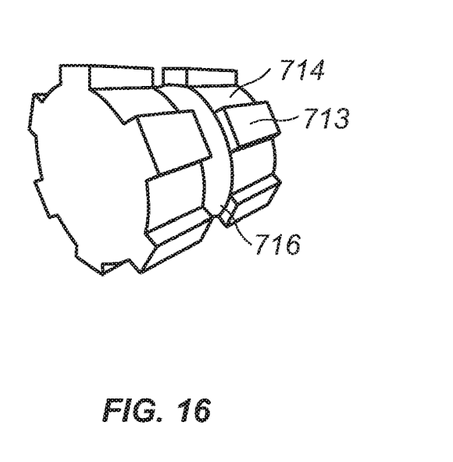
FIG. 16 is a perspective view of a Type 1 power take-off shaft.
Figure 17:
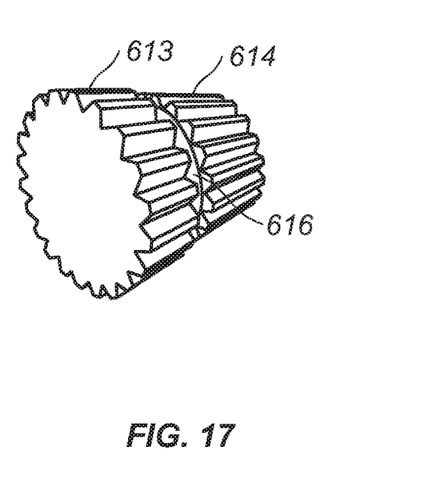
FIG. 17 is a perspective view of a Type 2 power take-off shaft.

A shaft section, 211, to match the shaft type (Type 1 or 2 as shown in FIGS. 16 and 17 or a smaller shaft that are sometimes found on smaller tractors and mowers) of the PTO shaft is attached to the proximal face of the component. This shaft may be welded to the second surface, or may be attached by threaded connection or by any other suitable means that will allow it to withstand the torque forces of the system in use. Threading the end of the shaft and placing it into a tapped hole in the support surface facilitates easy changes of the second component to accommodate different shaft types of shaft connection on the implement. For one releasable embodiment of this component, the shaft has a slot, 216, for a releasable connection as described above and may have a hole 218 for certain types of conventional connections.

In some situations, as where the implement is connected to the tractor by side bars, the length of the implement PTO shaft plus the second component may be too long. If so, the shaft on the implement must be shortened to accommodate the component 200. It must be shortened enough to allow for the change in length the PTO shaft (typically about 4 inches) during the lifting and lowering of the implement and not apply any axial load on the shaft or damage to the tractor PTO system will result.

Figure 6:
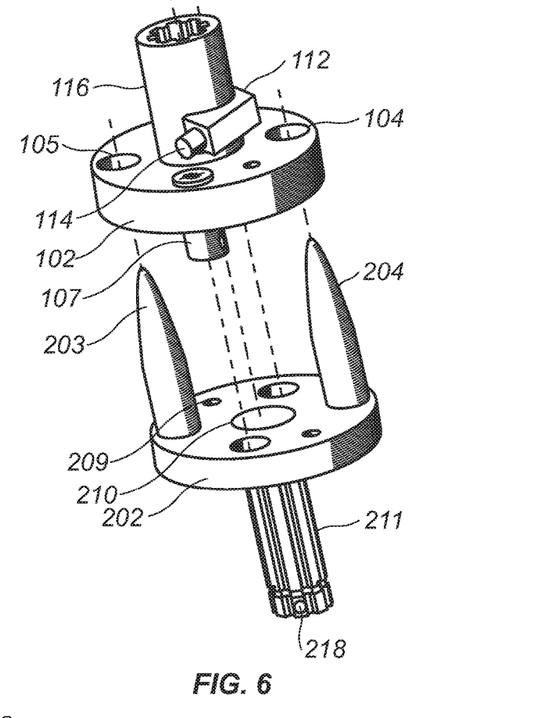
FIG. 6 is a perspective view of a first and second component of an embodiment of a two component coupling system of the invention illustrating the way the components are attached together.
Figure 7:
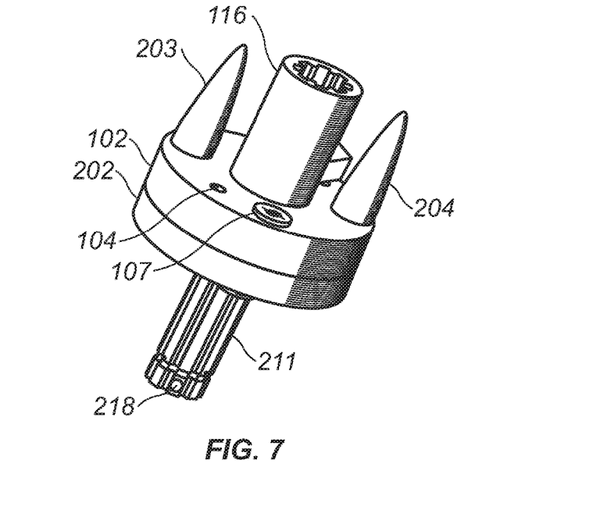
FIG. 7 is a perspective view of a first and second components of an embodiment of the invention showing the components attached together.

When the two components, 100 and 200, are connected as shown in FIGS. 5, 6 and 7 the alignment dowels 303 and 204 are inserted into the holes 104 and 105. The taper of the alignment dowels allows then to be inserted even when the components are not positioned exactly in line, thus facilitating easier, quicker and safer connection. Conventional PTO connections requires the PTO shaft and releasable connector to be perfectly aligned and therefore much more difficult to connect. When the components are in place, a pin or bolt (preferable commercially available lynch pin) is inserted into the holes 118 and 119 to lock the components together. Items 214 and 215 are optional small projections placed alongside the alignment holes 204 and 205 to ensure that the locking pins are inserted in only one direction. This is desirable to allow the pins that do not have means to hold them in place (such as the ring on lynch pins) will be maintained in place by the centrifugal force of the rotation of the shaft and components. Any suitable pin or nut and bolt is sufficient for the connection but lynch pins are inexpensive and readily available. A cap screw or equivalent may optionally be placed into holes 208 and 209 and screwed into the threaded holes 108 and 109. The cap screws serve two purposes; 1. to minimize wear on the adapter if there is a (for example) heavy constant velocity (CV) attached, and 2. as means of retaining the two pieces together in case the lynch pins are lost or otherwise not available.

The size and dimensions of the two components will be dictated by the size of the PTO driver and implements, more powerful PTO and heavier implements will necessarily require larger couplers. An exemplary prototype sized to accommodate a tractor PTO of about 90 horse power (HP) has the following dimensions:

The support plate 101 is made of carbon steel, is round with a diameter of 5.625 inch and thickness of one (1) inch. The holding dowels 104 and 105 are one (1) inch in diameter spaced 180° apart from the holes 103 and 102 and are sized to accommodate the one inch diameter holding dowels. The tapped holes 106 and 107 are 0.421 inch diameter. The 200 component also has a round support plate with a 5.625 inch diameter, thickness of 5/8 inches and positioning dowels of one (1) inch diameter and are 3.85 inches in length. Holes 208 and 209 for cap screws are ½ inch in diameter. The shaft 214, as shown is a Type 2 shaft. The holding dowel holes 118 and 119 are sized to accommodate 7/16 lynch pins. These are prototype dimensions for illustration of embodiments of the invention.

A prototype was made of carbon steel and that is preferred but the components made also be made of aluminum, stainless steel are other suitable metals or of engineered polymers such as DuPont™ Zytel® HTN high-performance polyamide resin which is a partially an aromatic nylon; nylons; polyethylene terephthalate and others such high strength polymers known to those skilled in the art including polymers reinforced with fibers (filled). Engineered polymers and filled engineered polymers have the advantage of preventing sparking or the rotating coupler which is sometimes responsible for fires in field such as fields of dried hay or grass.

Operation

To attach the first component this system to the PTO shaft on the tractor (or other driver shaft) requires the male splines on the tractor PTO shaft to be lined up with the female splines on the tractor end of the adapter. Once the device is started on the PTO shaft, a locking button is pressed and the device is slid forward until the button will remain in the pressed down or inward position. The device must continue to be pushed forward until the locking button comes out to its normal locking position.

To attach the second or implement component to the drive shaft requires the male splines on the adaptor to be lined up with the female splines of the drive shaft. Once the device is started on the drive shaft of the implement, a locking button is pressed or a sleeve is pulled on the drive shaft and the device is slid forward until the button or sleeve will remain in the pressed down or rearward position. The component must continue to be pushed forward until the locking button or locking sleeve returns to its normal locked position.

To connect the two pieces together the tractor is positioned close enough for the drive shaft on the implement to make contact with the PTO shaft on the tractor. The two alignment dowels are aligned with the two vacant holes on the first component then pushed forward until both pieces make full contact with each other. Once the two pieces are fully connected, lynch pins are inserted into the holes of the dowel pins to retain both pieces together. Additionally, two ½" NC cap screws to retain both components may be used.

Model 200

Figure 8:
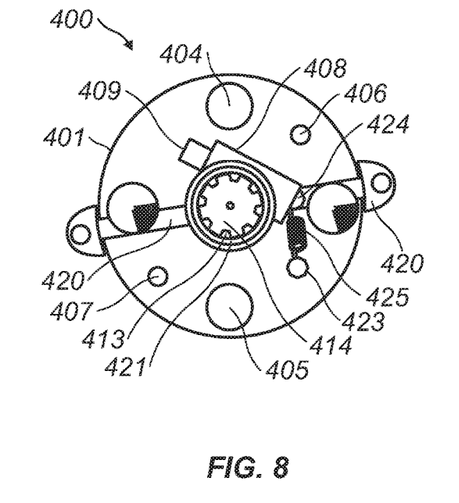
FIG. 8 is a plan view of the rear, proximal, side view of a first component of another embodiment of a two component coupling system the invention.
Figure 9:
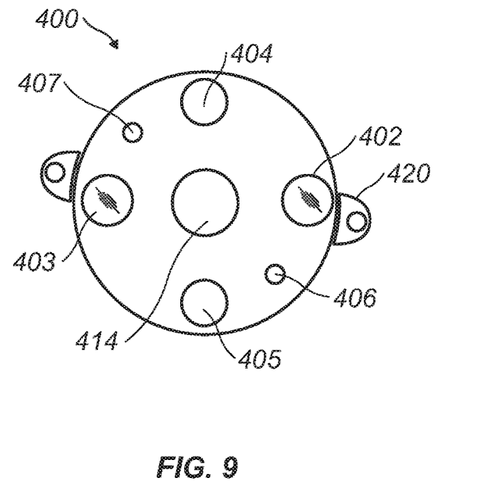
FIG. 9 is a plan view of the front, distal, side view of a first component of an embodiment of a two component coupling system the invention.

FIGS. 8-15 relate to the second set of embodiments (Model 200), having an automatic locking system. FIG. 8 is a plan view of the rear or proximal (facing towards a tractor or driver) or side of the first component of this second set of embodiments. FIG. 9 is a plan view the distal side of the first component. This first component has a support plate structure 401 to which is attached holding dowels 404 and 405. These dowels are of sufficient length projection from the distal face of the plate structure to pass through the holes 506 and 507 in the implement component 500. The dowels may be attached by welding or screwed connection. The holding dowels may optionally have a hole, 421, for inserting of a pin to lock the components together as shown if FIGS. 12 and 13. They must be of sufficient size and strength to withstand the rotational torque when connected and operational. The first component has openings, 402 and 403 for receiving positioning dowels (502,503).

Items 408 and 409 are one embodiment of releasable means to attach the component to a power take-off (PTO) shaft ((see shaft types in FIGS. 16 (Type 1) and 17 (Type 2))) of a tractor or other prime mover. Items 406 and 407 are optional holes that may be tapered for female threads to allow a set screw to be placed through the implement (second) component 506 and 507 to add additional means to connect the component together. Item 408 is a receiver for the male splines of the shaft—the receiver has female splines and functions in the same manner as the releasable connectors for conventual PTO connection system. Items 408 and 409 illustrate a conventional spring lock that connects the parts together. As describe for the embodiment (s) of Model 100 above, as the female splined receiver (408) is moved onto the shaft, spring(s) behind bearings in the receiver are compressed until the receiver is advanced sufficiently far onto the shaft so that the bearings drop into a slot, 516, on the shaft. The receiver and shaft are disconnected by compressing the push button 409 to release the spring pressure holding the bearing into the shaft slot. This shaft attachment means, 414, is a commercially available receiver that is welded or otherwise securely attached onto the component. Other means to attach the tractor component 400 to a PTO shaft are also suitable. Additionally, while a releasable means is preferred, the component may be permanently attached to a PTO shaft, as by welding or pressure fitting.

As illustrated in FIGS. 8 and 12-15, the second component has a latch system consisting of a latch 420 that is positioned to partially cover the alignment holes 402 and 403. In one embodiment, the latch, 420 is attached to the component by a ring, 424, that surrounds the shaft attachment means 414 to allow the latch 420 to rotate. An expandable holding means, such as a spring 422 is attached to the latch by attachment 423 and 425 and a pin in the support plate that holds the latch in place in a position that it partially covers the holes 402 and 403. When the two components are attached, the tapered alignment dowels 502 and 503 are pushed through the holes 402 and 403 and these dowels push the latch away from the hole by expanding the spring. When the alignment dowels, 502 and 503 are fully seated, the latch drops into slots 522 on the dowels, thus automatically latching the components together. There may also be a safety pin inserted through the component support face into a hole in the latch 420. The term "rotating spring latch" is used herein and in the claims to designate the latch described above in this paragraph.

Additionally, in some embodiments, the holding dowels 405 may be of sufficient length and have holes that are exposed when the components are joined. The expandable holding means may be a spring or other elastic device as shown or may be a leaf, helical coil or spiral spring attached around the latch holding ring 424. Other suitable means to achieve the function to allowing the alignment to move the larch on joining the components are within the scope of the invention.

Figure 10:
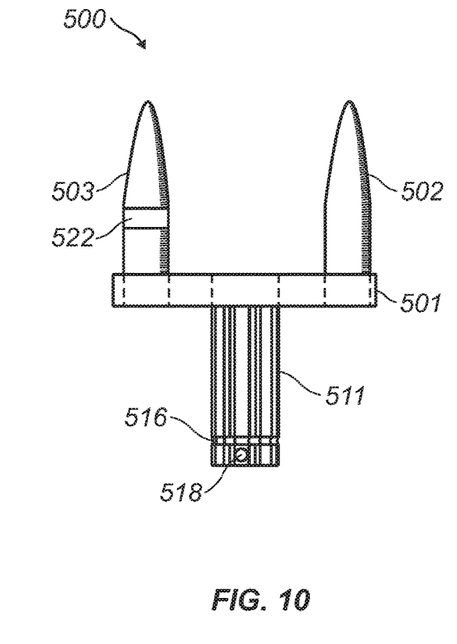
FIG. 10 is a plan view of a side view of an embodiment of a second component of a two component coupling system of the invention.
Figure 11:
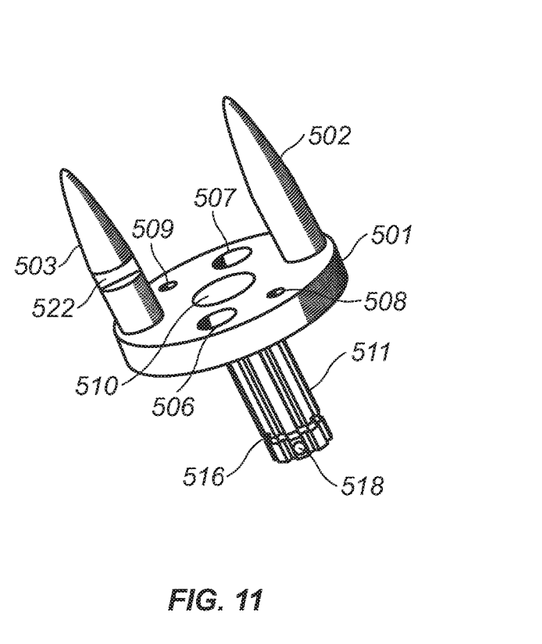
FIG. 11 is a perspective view of a first component of an embodiment of a two component coupling system the invention.
Figure 12:
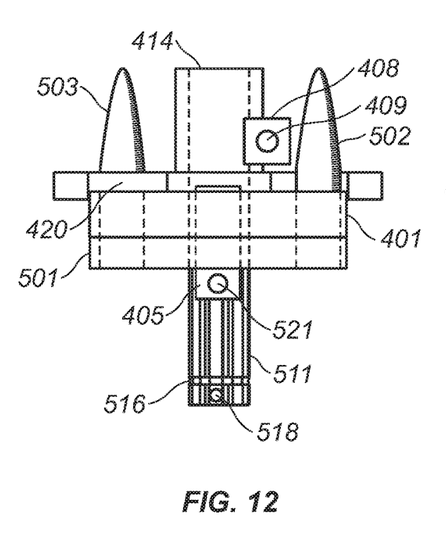
FIG. 12 is a side plan view of a first and second components of an embodiment of the invention attached together.
Figure 13:
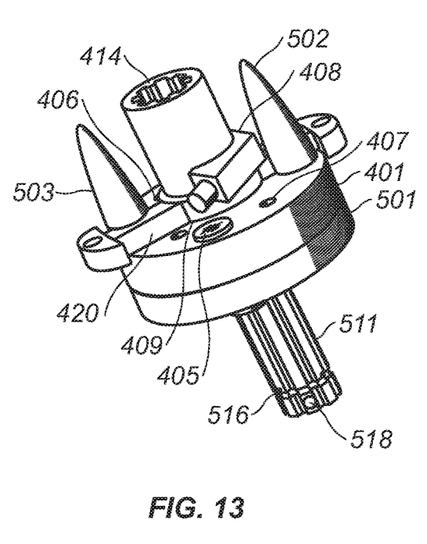
FIG. 13 is a perspective view of a first and second components of an embodiment of the invention showing the components attached together.
Figure 14:
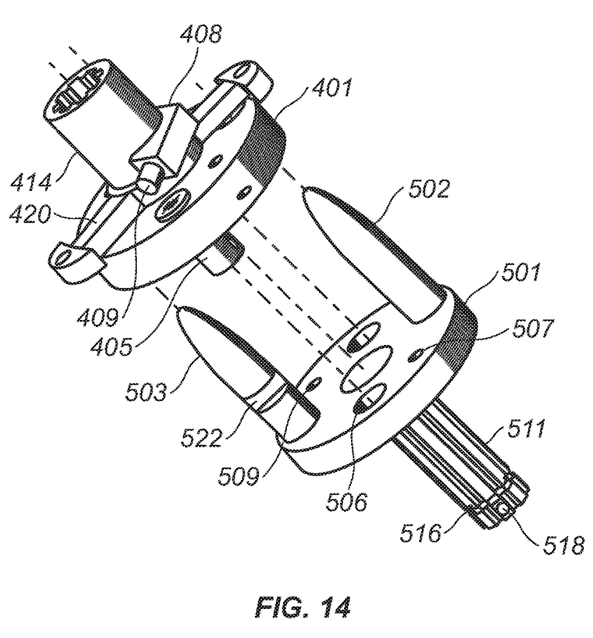
FIG. 14 is perspective view of a first and second component of an embodiment of a two component coupling system of the invention illustrating the way the components are joined together.
Figure 15:
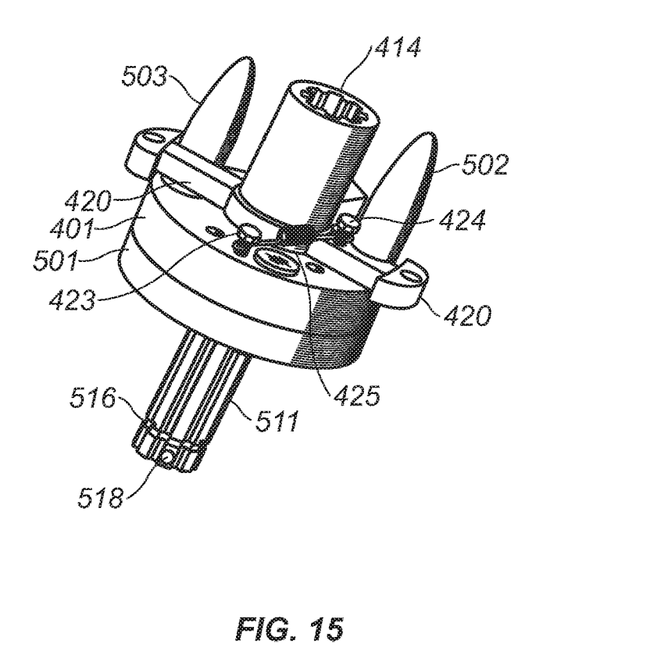
FIG. 15 is another perspective view of a first and second components of an embodiment of the invention showing the components attached together.

FIGS. 10 and 11 are a side and perspective view of second (implement) component, 500, of embodiment set for Model 200. It comprises a plate structure 502 with tapered alignment dowels 502 and 503 and alignment holes to receive the holding dowels from the first (PTO) component (506 and 507). As in the first set of embodiments (Model 100) it is preferred that the alignment dowels are cylinders, having an equal diameter section at the end adjacent the support plate surface that is at least the length of the receiving hole in the first component and tapered shape beyond the equal diameter section.

A shaft section, 511, to match the shaft type (Type 1 or 2 as shown in FIGS. 16 and 17 or a smaller shaft that are sometimes found on smaller tractors and mowers) of the PTO shaft is attached to the proximal face of the component. For one releasable embodiment of this component the shaft has a slot, 522 for an automatic connection as described above and may have a hole 518 for certain types of conventional connections. When the two components, 400 and 500, are joined as shown in FIG. 12-15 the alignment dowels (502 and 503) are inserted into the holes 404 and 405. The holding dowels, 405 will be inserted in the holes 506 and 507. The holding dowels should be of a length to project at least ¾ way into the receiving holes and preferable of the full depth of the holes. Optionally the holding dowels may be longer with holes for lynch pins as in the embodiment as in Model 100 described above. The length and taper of the alignment dowels, 502 and 503, allow them to be inserted into their receiving holes even when the components are not positioned exactly in line, thus facilitating an easier and quicker connection. Conventional connection requires the PTO shaft and releasable connector to be perfectly aligned and is much more difficult to connect.

A cap screw or equivalent may optionally be placed into holes 506 and 507 and screwed into the threaded holes 406 and 407. As with the embodiment of Model 100 these cap screws serve two purposes; 1. to minimize wear on the adapter if there is a (for example) heavy constant velocity (CV) attached, and 2. as means of retaining the two pieces together in case the lynch pins are lost or otherwise not available. The dimensions of the components will be dictated by the size of the PTO and implements, more powerful PTO and heavier implements will necessarily be larger. A prototype sized to accommodate up a 90 horse power (HP) tractor PTO.

The plate 401 is made of carbon steel, round with a diameter of 5.625 inch and thickness of one (1) inch. The holding dowels 404 and 405 are one (1) inch in diameter spaced 180° apart and the holes 402 and 403 and sized to accommodate the one inch holding dowels. The tapped holes 406 and 407 are 0.421 inch diameter. The 500 component is also round with a 5.625 inch diameter, thickness of ⅝ inches and positioning dowels of one inch diameter and 3.85 inches in length. Holes 406 and 407 that optionally hold cap screws are ½ inch in diameter. The shaft 214, as shown is a Type 1 shaft. These are prototype dimensions for illustration.

Operation

As for embodiment of Model 100, to attach the first or tractor component (400) to the PTO shaft on the tractor requires the male splines on the tractor PTO shaft to be lined up with the female splines on the first coupler component 400. Once the device is started on the PTO shaft of the tractor, a locking button, 409, is pressed and the device is slid forward until the button will remain in the pressed down or inward position. The device must continue to be pushed forward until the locking button comes out to its normal locking position. This locking method is common throughout the industry.

To attach the implement or second component, 500, to the implement drive shaft requires the male splines, 502 and 503, to be lined up with the female splines of the drive shaft. Once the device is started on the drive shaft of the implement, a locking button on the implement is pressed or a sleeve is pulled on the drive shaft and the device is slid forward until the button or sleeve will remain in the pressed down or rearward position. The device must continue to be pushed forward until the locking button or locking sleeve returns to its normal position.

To engage the coupling system the user will position the tractor close enough for the drive shaft on the implement to contact the PTO shaft on the tractor (driver). The two alignment dowels, 502 and 503, are aligned with the two vacant alignment holes, 402 and 403 on the tractor end of the coupler component and then push forward until both pieces make full contact with each other and the locking mechanism is lock the two components together.

Once the two pieces are fully connected a ¼" safety pin may optionally be installed. Or in addition, the owner may use two ½ inch NC cap screws to retain both components. As with the embodiments of Model 100 the implement drive shaft may need to be shortened.

PTO Shield

Every tractor sold in the United States since the late 1950s is required to have a safety shield covering the PTO shaft. The current standards for PTO shaft shields is in American Society of Agricultural Engineers (ASAE) reference standards number S203.13. Since the two component coupler of the present invention extends the length of the PTO shaft it may be desirable to provide an extended shield, either a longer replacement shield or an attachment to the existing shield to extend its length. Such an attachment may a shield of about the same thickness of their original shield that overlaps the current shield (a minimum of 2 inches is appropriate) and extends past the end of the PTO shaft on the driver a minimum of 4 inches.

PTO Coupler Kit

The invention also encompasses kits of the coupler components that can be assembled for convenience. One kit will contain the first and second component of either Model 100 or 200, together with two lynch h pins, and caps screws. The kit may also include detailed instruction sheet and a partial shield extension as described above.

The detailed description set forth herein about the appended drawings is intended as a description of exemplary or illustrative embodiments in which the presently disclosed apparatus and system can be practiced. The term "exemplary" and "illustrative" used throughout this description means "serving as an example, instance, or illustration," and should not necessarily be construed as preferred or advantageous over other embodiments.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded as illustrative rather than a restrictive. Therefore, the scope of the invention should be limited only by the appended claims.

The invention claimed is:

1. A two-component power take-off coupling system comprising;
   a first component adapted for permanent or releasable attachment to a power take-off shaft of a tractor or other rotary driver and a second component for attachment to a power take-off shaft of an implement to be coupled to the first component,
   wherein, the first component comprises a support plate structure having a proximal side facing the tractor or driver body when in use and a distal side facing out and away from the tractor or driver body when in use, and having at least two alignment holes through the surface of the support structure and two holding dowels projecting from the surface of the support plate, the dowels being spaced apart from the holes on the of the plate;
   wherein the second component comprises a support plate having a proximal side facing the implement to be connected to the first component when in use and a distal side facing out and away from the implement body when in use, and wherein the second component has two tapered dowels on the distal side surface positioned and sized to be placed in the alignment holes on the first component and has two holes spaced apart from the dowels positioned and sized to receive the holding dowels of the first component and has a section of a power take-off shaft attached to the center of the proximal side of the second support plate.

2. The two-component power take-off coupling system of claim 1 comprising at least two smaller holes located in the support plate of the first and second components, located and sized to align with each other when the components are joined together and wherein the holes in the first support plate are tapped for screw threads.

3. The two-component power take-off coupling system of claim 1 wherein the two holding dowels projecting from the surface of the support plate of the first component have holes located in them near an end away from the support plate and wherein the dowels have a length such that the holes in the dowels will extend beyond the surface of the distal side of the second when the dowels are inserted into holes in the second component and the first and second component are joined together.

4. The two-component power take-off coupling system of claim 3 comprising latch pins sized to fit into the holes in the holding dowels.

5. The two-component power take-off coupling system of claim 1 wherein the second component alignment dowels are cylinders, having an equal diameter section at the end adjacent the support plate surface and a length of at least of the depth of the alignment hole in the first component and a tapered shape beyond the equal diameter section.

6. The two-component power take-off coupling system of claim 1 wherein the first component has a latch system that automatically connects to slots in the second component alignment dowels when the alignment dowels are inserted into the alignment holes on the first component and the components are positioned together.

7. The two-component power take-off coupling system of claim 6 wherein the latch is a rotary spring latch system and the alignment dowels of the second component have slots positioned and sized to allow the latch to drop into the slots when the first and second component are positioned together.

8. The two-component power take-off coupling system of claim 7 wherein the two holding dowels projecting from the surface of the support plate of the first component have holes located in them near an end away from the support plate and wherein the dowels have a length so that the holes in the dowels will extend beyond the surface of the distal side of the second when the dowels are inserted into receiving holes in the second component and the first and second component are positioned together.

9. The two-component power take-off coupling system of claim 1 wherein the alignment dowel and the holding dowels have threaded ends and are screwed into holes tapped for threads of their respective support plates.

10. The two-component power take-off coupling system of claim 1 wherein the first and second components are constructed from carbon steel, stainless steel, aluminum or high strength engineered polymers.

11. A method of connecting a power take-off shaft from a tractor or other rotary driver to the power shaft of an implement comprising;
    a.) attaching to the tractor or rotary driver power take-off shaft a first component comprising a support plate structure having a proximal side facing the tractor or driver body when in use and a distal side facing out and away from the tractor or driver body when in use, and having at least two alignment holes through the surface of the support structure and two holding dowels projecting from the surface of the support plate, the dowels being spaced apart from the holes on the of the plate;
    b.) attaching to the rotary power shaft of an implement a second component comprising a support plate having a proximal side facing the implement to be connected to the first component when in use and a distal side facing out and away from the implement body when in use, and wherein the second component has two tapered dowels on the distal side surface positioned and sized to be placed in the alignment holes on the first component and has two holes spaced apart from the dowels positioned and sized to receive the holding dowels of the first component and has a section of a power take-off shaft attached to the center of the proximal side of the second support plate; and
    c.) aligning the first and second components and positioning them together so that the alignment dowels of the second component are fully seated in the alignment holes of the first component and locking the component together.

12. The method of claim 11 wherein the two holding dowels projecting from the surface of the support plate of the first component have holes located in them near an end away from the support plate and wherein the dowels have a length such that the holes in the dowels will extend beyond the surface of the distal side of the second when the dowels are inserted into holes in the second component and the first and second component are placed together.

13. The method of claim 11 wherein the first component has a latch system that automatically connects to slots in the second component alignment dowels when the alignment dowels are fully inserted into the alignment holes on the first component.

14. The method of claim 11 wherein the latch is a rotary spring latch system and the alignment dowels of the second component has slot positioned and sized to allow the latch to drop into the slots when the first and second component are positioned together.

15. A kit comprising:
   a first component adapted for permanent or releasable attachment to the power take-off shaft of a tractor or other rotary driver and a second component for attachment to the power take-off shaft of an implement to be coupled to the first component;
   wherein; the first component comprises of a support plate structure having a proximal side facing the tractor or driver body when in use and a distal side facing out and away from the tractor or driver body when in use, and having at least two alignment holes through the surface of the support structure and two holding dowels projecting from the surface of the support plate, the dowels being spaced apart from the holes on the of the plate;
   wherein the second component comprises a support plate having a proximal side facing the implement to be connected to the first component when in use and a distal side facing out and away from the implement body when in use, and wherein the second component has two tapered dowels on the distal side surface positioned and sized to be placed in the alignment holes on the first component and has two holes spaced apart from the dowels positioned and sized to receive the holding dowels of the first component and has a section of a power take-off shaft attached to the center of the proximal side of the second support plate;
   cap screws adapted for use in connecting the components; and
   two latch pins adapted to fit into hole in the holding dowels of the first component.

* * * * *